Nov. 20, 1934.   C. TAPPAN   1,981,207
SOUND-ON-FILM RECORDING CAMERA
Original Filed June 7, 1932   2 Sheets—Sheet 1
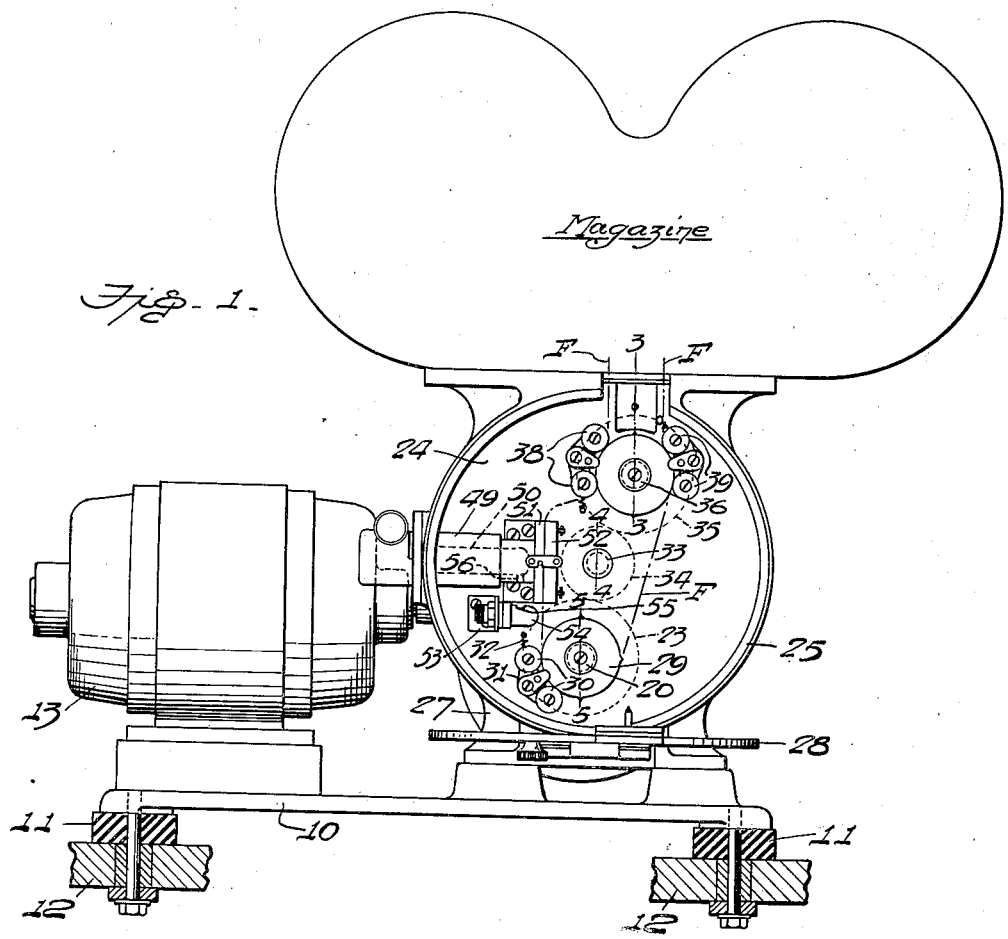
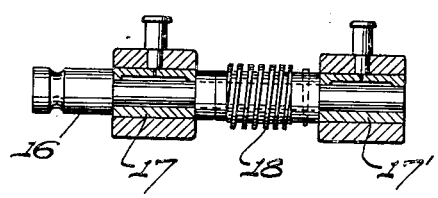
Inventor
Chester Tappan
By David Pelton Moore
Attorney Nov. 20, 1934.　　　　　C. TAPPAN　　　　　1,981,207
SOUND-ON-FILM RECORDING CAMERA
Original Filed June 7, 1932　　2 Sheets-Sheet 2
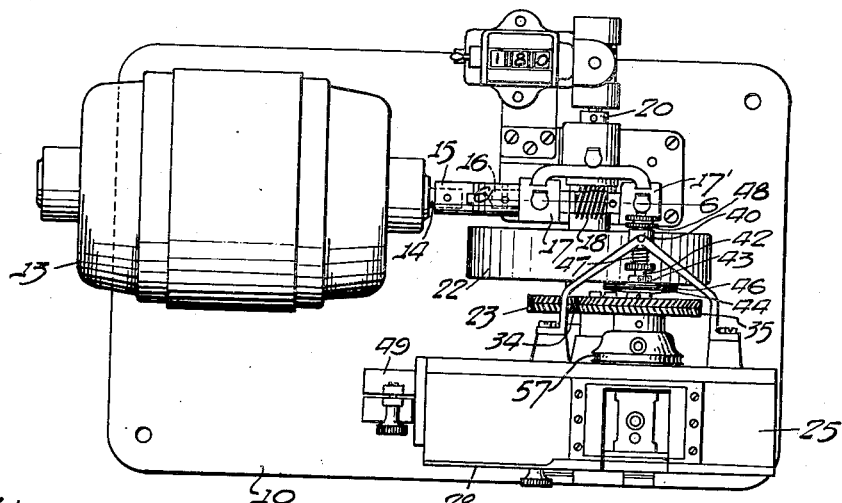
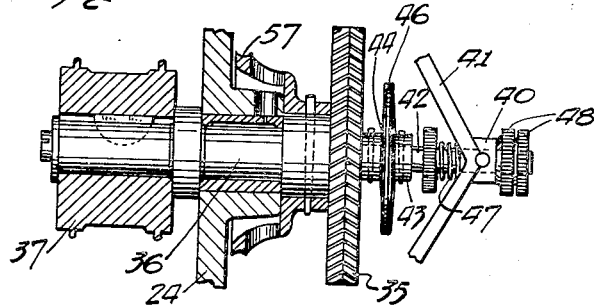
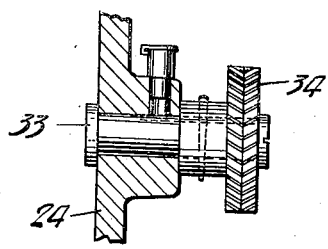
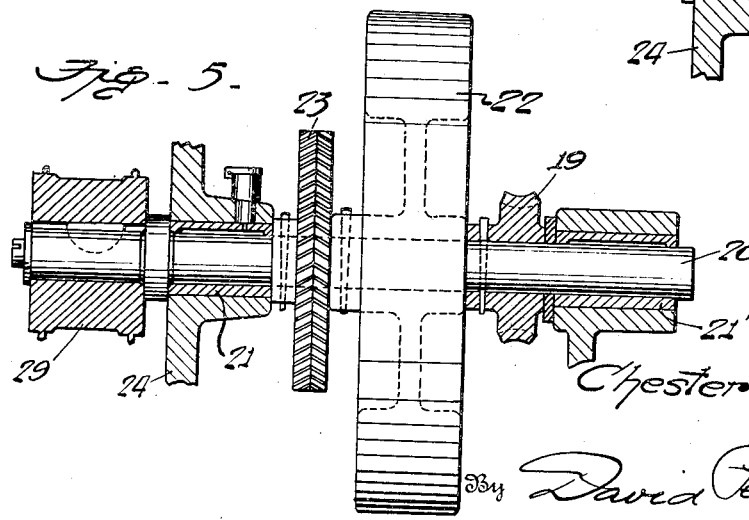
Inventor
Chester Tappan
By David Pelton Moore
Attorney Patented Nov. 20, 1934

1,981,207

UNITED STATES PATENT OFFICE 1,981,207

SOUND-ON-FILM RECORDING CAMERA

Chester Tappan, New York, N. Y., assignor to General Talking Pictures Corporation, New York, N. Y., a corporation of Delaware Application June 7, 1932, Serial No. 615,923
Renewed June 8, 1934

4 Claims. (Cl. 179—100.3)

The present invention relates to improvements in sound-on-film recording cameras, one object of the invention being the provision of a novel form of circular casing constituting a sound head in which the relative parts thereof are easily located and machined so as to reduce the cost of production and thereby produce a more practical construction and arrangement of parts.

Another object of this invention is a provision of a camera of this type adapted to be mounted adjustably upon a supporting base with its motor and a novel form of gearing whereby the elements of the sound head and the film magazines are operating in unison.

Still another object of this invention is a provision of a lamp support for the light modulated lamp provided with means whereby the light from the lamp actuates the monitoring photo-electric cell which in turn in ordinary practice is connected to an amplifier and monitor loud speaker, thus providing a means whereby a check is had upon the light modulated lamp at all times during the recording operation.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings,—

Figure 1 is a side elevation of the complete camera, the door to the film progressing mechanism being open.

Figure 2 is the top plan view thereof with the film magazine removed.

Figure 3 is a section on line 3—3 of Figures 1 and 2.

Figure 4 is a section on line 4—4 of Figure 1.

Figure 5 is a section on line 5—5 of Figure 1.

Figure 6 is a detailed sectional view on line 6—6 of Figure 2.

Referring to drawings:

The numeral 10 designates the base which may be supported in any well known manner, but here shown as mounted upon a plurality of soft rubber members 11 and bolted to a support 12.

Mounted upon this base is an electric motor 13 whose shaft 14 through a flexible tubular coupling 15 is connected to one end of a short shaft 16 mounted in two bearings 17—17', and upon this shaft is mounted a worm 18. This worm 18 meshes at all times with its complementary gear 19 keyed to the shaft 20 journaled in bearings 21—21' and supported upon the base. Also fixed to this shaft between the bearings is a fly or balance wheel 22 adjacent thereto and also upon the shaft and on opposite side of the fly wheel to the gear 20 is a herring-bone gear 23. The bearing 20 is formed in the wall 24 of the main circular casing 25 which as here shown consists of a circular box having the supporting casting 27 for attaching the same in fixed relation upon the base 10. This casing is provided with a hinged door 28 by means of which the casing may be sealed light-tight. As the inner end of the shaft 20 is projected within the casing there is mounted fixedly upon the same, a film progressing sprocket 29 having a co-operative pair 30 of rollers mounted upon the swinging member 31 whose spring 32 normally holds the rollers towards the sprocket and thus retain the film F as shown in Figure 1 thereagainst.

Mounted co-axial of the casing is a short shaft 33 upon which is a rotatable gearing 34 which meshes at all times with the herringbone gear 23 and transmits motion therefrom to the large herringbone gear 35 carried by the upper shaft 36, which shaft as shown in Figure 3 is journaled in the wall of the casing and carries upon the end within the casing the upper film progressing sprocket 37, which as shown in Figure 1 is provided with two oppositely disposed pairs 38 and 39 of film engaging rollers, same being similar in construction to that used in conjunction with the lower sprocket heretofore described. Attached to the rear wall of the casing and fitting astride of the large gear 35 and provided with a socket 40, is a yoke 41 so that the outer small end of the shaft 42 may be mounted and held fixed in the socket. Mounted for sliding movement upon the inner end of this shaft is a disc 43 which co-operates with a similar disc 44 carried upon the adjacent end of the shaft 45 with a circular disc 46 of leather there-between.

Also mounted upon the shaft 42 is a spring 47 which exerts a tension to hold the brake device in such manner that any back lash imparted by the gearing is prevented from affecting the film progressing mechanism of the camera, a pair of milled nuts 48 being provided for regulating the tension of the spring and in consequence the braking action. Although this type of brake device is here shown it is apparent that any type of well known braking mechanism such as a drum and shoe may be employed without departing from the spirit of the present invention.

Mounted in a rim of the circular casing at a point at approximately 90 degrees from the perpendicular centre thereof is a tube 49 in which is mounted a recording lamp 50 the same being of any well known or desired type and adjacent the inner end of this tube is a fixed film gate 51 to which is attached a hinged co-operating film gate member 52 so that the film may be directed as indicated in Figure 1. A bracket 53 is disposed within the casing and has attached thereto removably, a photo-electric cell carrying member 54 whose opening 55 is adjacent the opening 56 of the recording lamp carrying tube. This constitutes a monitor and is to be connected in an amplifying system so that the operator of the camera may know at all times whether or not the recording lamp is operating normally.

A pulley 57 is mounted upon the shaft 36, and is to drive the take-up reel (not shown) of the magazine.

From the foregoing description it is evident with the structure as herein described and illustrated an exceedingly compact type of camera is provided and that the magazine M is bodily supported upon and carried by the sound recording unit casing.

What is claimed is:

1. A sound-on-film camera including in combination a support, a circular casing open at one side and mounted upon said support with the open end at right angles to the base thereof, said casing being provided with an opening adjacent the top thereof and through which the film is passed, a double film magazine casing mounted upon the circular casing which constitutes a support therefor, an axially mounted shaft mounted in the circular casing and projected externally thereof, a gear mounted thereon two substantially diametrically disposed shafts mounted in the circular casing and upon opposite sides of the first shaft, the inner ends of the shaft projecting within the casing, two film drivng sprockets, one mounted upon each of the latter shafts within the casing, a fly wheel mounted upon the lower of the last two shafts externally of the casing, a prime mover operably connected to said latter shaft for driving the same, a gear mounted upon the latter shaft and meshing with the first gear of the axially mounted shaft, and a gear carried by the remaining of the two shafts and in mesh with the gear upon the axially mounted shaft.

2. A sound-on-film camera as claimed in claim 1 in which an adjustable back lash preventing device is associated with the second of the two shafts to prevent any back lash due to the inertia of the fly wheel.

3. A sound-on-film camera according to claim 1 in which the driving connection between the worm and the fly wheel carried shaft includes a two membered journal at right angles to said shaft, a shaft carrying a worm gear mounted therein, a flexible connection connecting said shaft to the motor shaft and a gear mounted upon the fly wheel carried shaft and meshing with the worm gear.

4. A sound-on-film recording mechanism, including in combination, a support, a main casing opened at one side, a recording lamp support mounted in the rim thereof, a film gate disposed adjacent said support within the main casing, a drive shaft journaled in the casing and having one end projected within the casing below the film gate, a sprocket roller carried by said shaft within the casing to draw the film past the gate, a fly wheel, and a back lash preventing device associated with the fly wheel and said shaft exterior of the main casing to prevent any back lash due to the inertia of the fly wheel.

CHESTER TAPPAN.